United States Patent
Kakarala et al.

(10) Patent No.: US 7,974,489 B2
(45) Date of Patent: Jul. 5, 2011

(54) BUFFER MANAGEMENT FOR AN ADAPTIVE BUFFER VALUE USING ACCUMULATION AND AVERAGING

(75) Inventors: Ramakrishna Kakarala, Santa Clara, CA (US); Alexander C. Schneider, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1070 days.

(21) Appl. No.: 11/755,646

(22) Filed: May 30, 2007

(65) Prior Publication Data

US 2008/0298696 A1   Dec. 4, 2008

(51) Int. Cl.
G06K 9/40 (2006.01)
G06K 9/20 (2006.01)
(52) U.S. Cl. ........................................ 382/260; 382/321
(58) Field of Classification Search .................. 382/236, 382/238, 260, 305, 321; 375/240, 240.12, 375/240.16; 348/419.1
See application file for complete search history.

(56) References Cited

U.S. PATENT DOCUMENTS

| | | | |
|---|---|---|---|
| 5,867,613 A * | 2/1999 | Nishikubo et al. | 382/305 |
| 6,101,276 A * | 8/2000 | Adiletta et al. | 382/236 |
| 2005/0190274 A1 * | 9/2005 | Yoshikawa et al. | 348/231.99 |
| 2007/0086521 A1 | 4/2007 | Wang et al. | |

FOREIGN PATENT DOCUMENTS

| | | |
|---|---|---|
| JP | 2000-196902 | 7/2000 |
| JP | 2002-330283 | 11/2002 |
| JP | 2006/041862 | 7/2004 |

* cited by examiner

*Primary Examiner* — Yon Couso

(57) ABSTRACT

An optical imaging system with dynamic buffer management is described. Embodiments of the optical imaging system include an image sensor, a buffer, and a buffer mode controller. The image sensor includes a pixel array to read out a plurality of pixel lines for a frame of an image. The buffer is configured to store a plurality of buffer values corresponding to a plurality of pixel values for each of the pixel lines. The buffer mode controller is configured to dynamically switch between an accumulation mode and an averaging mode. The accumulation mode facilitates a computation of each buffer value according to a sum value of the corresponding pixel value and a corresponding previous buffer value. The averaging mode facilitates a computation of each buffer value according to an average value of a normalized value of the corresponding pixel value and the corresponding previous buffer value.

20 Claims, 10 Drawing Sheets

BUFFER MANAGEMENT FOR AN ADAPTIVE BUFFER VALUE USING ACCUMULATION AND AVERAGING

BACKGROUND OF THE INVENTION

Image blur is a problem in photography and has a variety of causes such as focusing errors and motion of the imaged object. Motion of the camera relative to the imaged object is another source of image blur. Camera motion is also referred to as camera shake, hand shake, or hand shudder. When a person is holding a camera during exposure, camera shake causes image blurring, particularly during long exposure times and for image enlargement (e.g., using a zoom or telephoto lens). Camera shake is typical because human muscles naturally tremor at frequencies approximately in the range of 4-12 Hz. Additionally, small cameras such as cell phone cameras are particularly prone to camera shake because they are constructed of lightweight materials and are sometimes awkward to hold during operation.

In efforts to reduce image blur, imaging devices such as hand-held cameras implement image stabilization. Image stabilization refers to reducing the effects of relative movement between an image sensor and an object being imaged. Some conventional image stabilization techniques for still camera systems, as compared to video camera systems, involve movement measurements and complementary mechanical displacement of a lens or image sensor. Such camera systems include gyroscopes (e.g., piezoelectric or microelectromechanical systems (MEMS) gyros) or other mechanical devices to measure the movement of the camera. Once the movement is measured, mechanical displacement systems physically move the image sensor in a manner to compensate for the movement of the camera. Other conventional systems physically move the camera lens to compensate for the detected camera movement. However these conventional mechanical systems are cost prohibitive and are often too large to be implemented in small camera systems such as cell phone cameras. Additionally, mechanical systems are subject to mechanical failures.

Another type of conventional image stabilization to compensate for hand shake motion experienced by a digital camera is implemented by combining pixel values for multiple frames into a fixed buffer over an image acquisition cycle. FIG. 1A depicts a schematic signal diagram 10 of pixel values for a pixel over an image acquisition cycle of multiple frames. In other words, a pixel value is obtained for each frame of the image. The pixel values are then combined, in some manner, to produce a final pixel value for the corresponding pixel of the image. This approach is applied to each pixel individually, although several pixels may be read out of an image sensor together in a pixel row (or column). The pixel value is represented by multiple bits (e.g., 8 bits) to provide a known granularity (e.g., 8 bits provides 256 values designated between 0 and 255).

Accumulation is one way to combine the pixel values obtained over several frames to produce a final pixel value for the corresponding pixel. FIG. 1B depicts a schematic signal diagram 20 of a cumulative buffer value from an exemplary conventional signal accumulation method. The final pixel value is represented by the cumulative buffer value. As shown in FIG. 1B, the pixel values of each frame are added together to produce the cumulative buffer value. However, if the buffer is the same size (i.e., has the same number of bits) as the individual pixel values (e.g., 8 bits), then the cumulative buffer value may result in an overflow condition, as depicted by the hashed area in FIG. 1B. To address this problem, conventional accumulation methods use a buffer that is large enough, or uses enough bits, to numerically avoid the overflow. For example, to accumulate 10 frames having 8 bits (256 possible values) per pixel, for a possible total value of 2,560 (i.e., 10×256), a numerically sufficient bit depth is 12 bits per pixel (bpp), which can accommodate over 4,000 possible values. However, using an increased bpp (e.g., 12 bpp instead of 8 bpp) for the buffer increases the memory size and bandwidth allocations. In the example described above, the buffer size and bandwidth are increased by 50% over the minimum possible bit depth of 8 bpp. For a high resolution image (e.g., 3 megapixels), the conventional accumulation method results in an unacceptably large increase in buffer size and bandwidth allocation.

Averaging is another conventional way to combine the pixel values obtained over several frames. FIG. 1C depicts a schematic signal diagram 30 of an average buffer value from an exemplary conventional signal averaging method. The final pixel buffer is represented by the average buffer value, instead of the cumulative buffer value, of the incoming pixel values. However, conventional averaging methods produce unacceptable results such as dark images when the imaged scene has low light levels.

SUMMARY OF THE INVENTION

Embodiments of a system are described. In one embodiment, the system is an optical imaging system with dynamic buffer management. Embodiments of the optical imaging system include an image sensor, a buffer, and a buffer mode controller. The image sensor includes a pixel array to read out a plurality of pixel lines for a frame of an image. The image is derived from a plurality of frames. The buffer is coupled to the image sensor to store a plurality of buffer values corresponding to a plurality of pixel values for each of the pixel lines. The buffer mode controller is coupled to the image sensor and the buffer. The buffer mode controller is configured to dynamically switch between an accumulation mode and an averaging mode. The accumulation mode facilitates a computation of each buffer value according to a sum value of the corresponding pixel value and a corresponding previous buffer value. The averaging mode facilitates a computation of each buffer value according to an average value of a normalized value of the corresponding pixel value and the corresponding previous buffer value. Other embodiments of the system are also described.

Embodiments of a method are also described. In one embodiment, the method is a method for buffer management in an optical imaging system. An embodiment of the method includes reading out a plurality of pixel lines from an image sensor for a frame of a plurality of frames in an image acquisition cycle. Each pixel line includes a plurality of pixel values. The method also includes storing a plurality of cumulative buffer values in a first buffer line of a buffer. The first buffer line corresponds to a first pixel line for the frame. Each cumulative buffer value includes a sum value of one of the pixel values of the first pixel line and a corresponding previous buffer value of a previous frame. The method also includes storing a plurality of average buffer values in a second buffer line of the buffer. The second buffer line corresponds to a second pixel line for the frame. Each average buffer value includes an average value of a normalized value of one of the pixel values of the second pixel line and a corresponding previous buffer value of a previous frame. Other embodiments of the method are also described.

Embodiments of a computer program product are also described. In one embodiment, the computer program product is a computer readable storage medium embodying a program of machine-readable instructions, executable by a digital processor, to perform operations to buffer multiple frames of an image acquisition cycle. In some embodiments, the operations include operations described above in relation to the optical imaging system and the buffer management method. Other embodiments may include different or additional operations. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 10A depicts a direct correlation between the pixel values and the buffer values. FIG. 10B depicts a vertically shifted correlation between the pixel values and the buffer values. FIG. 10C depicts a horizontally shifted correlation between the pixel values and the buffer values.

Throughout the description, similar reference numbers may be used to identify similar elements.

DETAILED DESCRIPTION

Figure 2:
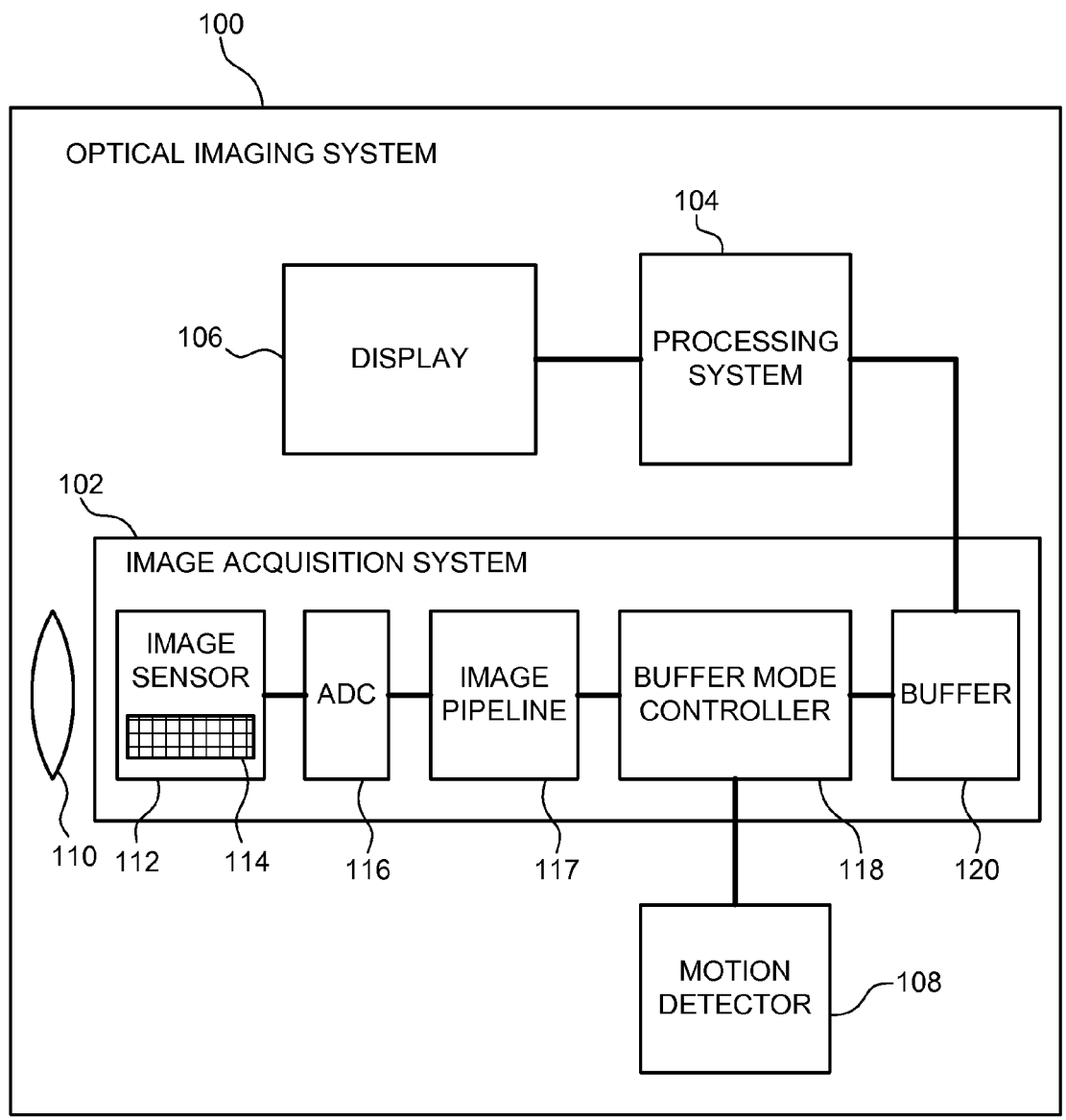
FIG. 2 depicts a schematic block diagram of one embodiment of an optical imaging system.

FIG. 2 depicts a schematic block diagram of one embodiment of an optical imaging system 100. The illustrated optical imaging system 100 includes an image acquisition system (IAS) 102, a processing system 104, a display device 106, a motion detector 108, and an optical element 110. In one embodiment, the optical element 110 is a single lens or a combination of lenses. Although the illustrated optical imaging system 100 includes certain components, described herein, other embodiments may include fewer or more components. For example, some embodiments omit the motion detector 108. Other embodiments include, for example, additional user interface components (not shown).

In one embodiment, the image acquisition system 102 receives incident light through the optical element 110 and generates electrical signals representative of the incident light. The depicted image acquisition system 102 includes an image sensor 112 with a pixel array 114. The image acquisition system 102 also includes an analog-to-digital converter (ADC) 116, an image pipeline processor 117, a buffer mode controller 118, and a buffer 120.

In one embodiment, the image sensor 112 generates a plurality of electrical signals corresponding to incident light at the pixel array 114. The image sensor 112 can be implemented using one of many technologies such as complimentary metal-oxide-semiconductor (CMOS) or charge-coupled device (CCD) technology. Each of the electrical signals corresponds to one of the picture elements (or pixels) of the pixel array 114. Hence, the electrical signals and the values they represent are also referred to as pixel values. Each pixel may be a photosensor or other photosensitive device.

In one embodiment, the pixels of the pixel array 114 are arranged in rows and columns, although other configurations may be implemented. Regardless of the physical arrangement of the pixels, the image sensor 112 reads out a group of pixel values at the same time from the pixel array 114. For example, where rows and columns are used, the image sensor 112 may read out an entire row at the same time—one pixel from each column—using parallel hardware for each column. For convenience in referring to the various possible arrangements of the pixel array 114, the group of pixel values read out at the same time is referred to herein as a pixel line, regardless of whether the pixel values correspond to a row of pixels, a column of pixels, or some other physical arrangement of a group of pixels.

In some embodiments, the image acquisition system 102 may acquire and combine several frames for a single image. Each frame is a set of signals acquired by the image sensor 112 at a distinct time. Acquiring and combining multiple frames for a single image may be useful to reduce image blur due to camera shake. The light signals for each frame are incident on the pixel array 114. For each frame, the image sensor 112 reads out a plurality of pixel lines. Each pixel line has a plurality of pixel values. The final image may be derived from one frame or a combination of frames.

In one embodiment, the optical element 110 facilitates resolution of images at the pixel array 114. The image sensor 112 then transmits the plurality of electrical signals to the ADC 116. The ADC 116 converts the analog electrical signals from the image sensor 112 to digital signals and then passes the digital signals to the image pipeline processor 117.

In one embodiment, the image pipeline processor 117 processes the digital signals before they are stored in the buffer 120. In particular, the image pipeline processor 117 may receive the digital signals from the ADC 116 and perform image pipeline operations such as gamma correction, pixel masking, color interpolation, white balance and digital gain, pixel statistical analysis, automatic exposure control, color space conversions, chrominance downsample, and other image pipeline operations. The ability to implement these and other image pipeline operations depends on the type of image pipeline processor used in the image acquisition system 102. In some embodiments, the image pipeline processor 117 is implemented through software instructions stored on a memory device within the optical imaging system 100. In other embodiments, the image pipeline processor 117 is implemented in hardware or a combination of hardware and software. After processing the digital signals, the image pipeline processor 117 then passes the processed signals to the buffer mode controller 118.

The buffer mode controller 118 controls storing the digital pixel signals, or some representation of the digital pixel signals, in the buffer 120. In one embodiment, the buffer 120 stores a plurality of buffer values corresponding to a plurality of pixel values for each pixel line of the pixel array 114. The buffer values may be representative of colors such as red, green, and blue color components. Alternatively, the buffer values may be representative of other light components such as luminance, chrominance, and so forth. In one embodiment, the buffer 120 stores 8 bits per color for each pixel, although other embodiments may store fewer or more bits per color (or other light component) for each pixel.

The buffer mode controller 118 is coupled, either directly or indirectly, to the image sensor 112 and the buffer 120. In one embodiment, the buffer mode controller 118 implements an adaptive mode, rather than strictly an accumulation mode or an averaging mode, to store buffer values in the buffer 120 based on the pixel values from the image sensor 112. In order to account for all of the frames in the final image, the buffer mode controller 118 adaptively determines which mode to use to combine the pixel values of each frame with the buffer values already stored in the buffer 120 from previous frames of the image acquisition cycle. An exemplary embodiment of the buffer mode controller 118 is shown in FIG. 3, which is described in more detail below.

Once the buffer values for the final image are stored in the buffer 120, the processing system 104 retrieves the buffer values from the buffer 120 for further processing. The processing system 104 may include a digital signal processor, a microprocessor, or some other type of general-purpose or application-specific processing device. In one embodiment, the processing system 104 conditions the electrical signals representing the final image and sends a display signal to the display device 106 to display the final image. In another embodiment, the processing system 104 may facilitate transmission of the final image to another computer device through a wired or wireless interface (not shown). Additionally, the processing system 104 may provide other functionality that is known to be available on a digital imaging device such as a digital camera.

Although the description above describes a particular implementation of the optical imaging system 100, other embodiments may be implemented using alternative structures to provide similar, more, or less functionality. Additionally, the schematic configuration of the various components is not necessarily indicative of an actual physical arrangement of the optical imaging system 100.

Figure 3:
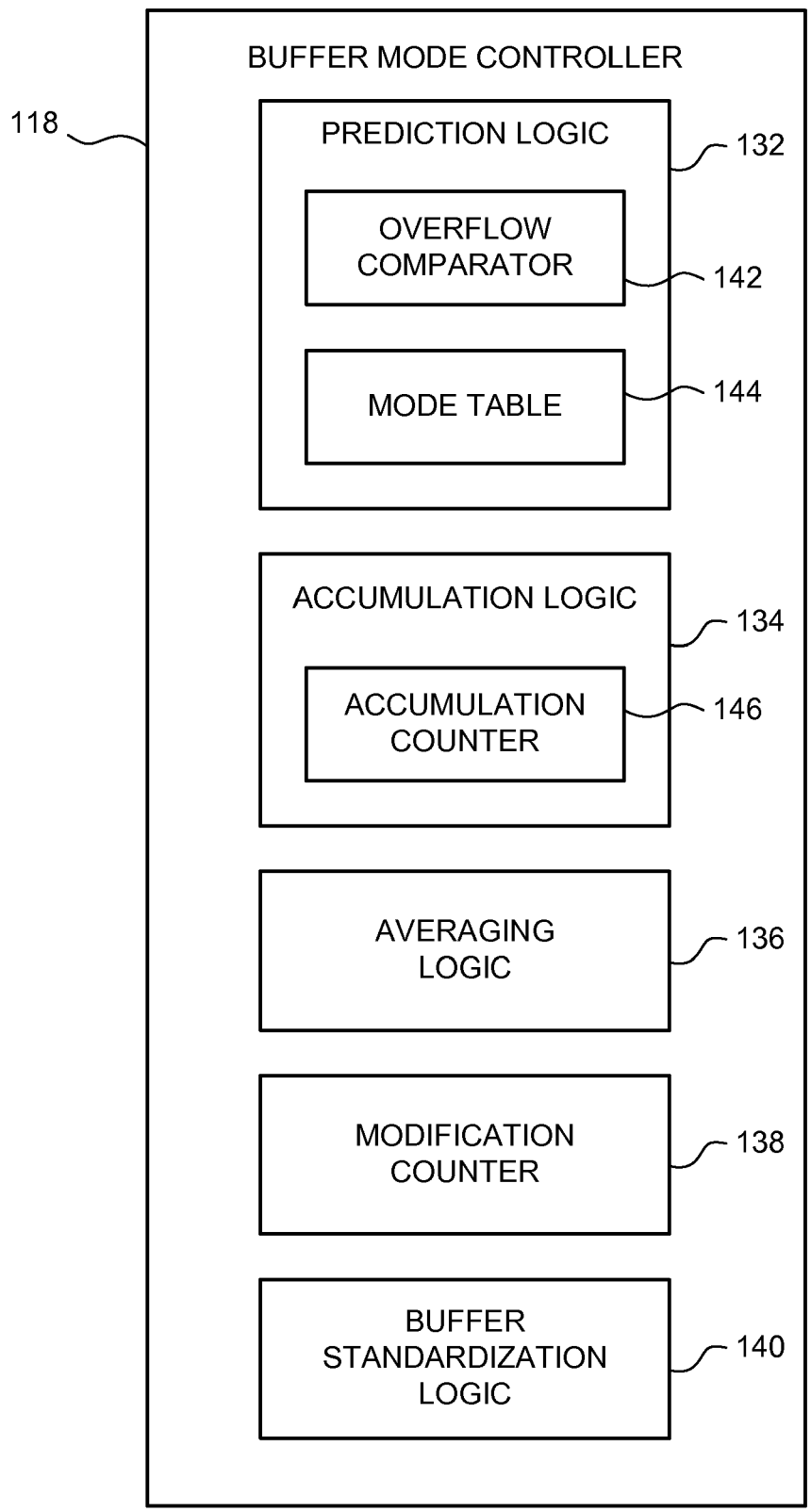
FIG. 3 depicts a schematic block diagram of one embodiment of the buffer mode controller of the optical imaging system shown in FIG. 2.

FIG. 3 depicts a schematic block diagram of one embodiment of the buffer mode controller 118 of the optical imaging system 100 shown in FIG. 2. The depicted buffer mode controller 118 includes prediction logic 132, accumulation logic 134, averaging logic 136, modification logic 138, and buffer standardization logic 140. In some embodiments, the various logic blocks are implemented in hardware. In other embodiments, the functionality of the logic blocks may be implemented in software. Where such logic blocks are implemented in software, the logic of each block is implemented using one or more machine-readable instructions stored on a computer-readable storage medium. Alternatively, the logic blocks may be implemented using some combination of hardware and software.

Figure 5:
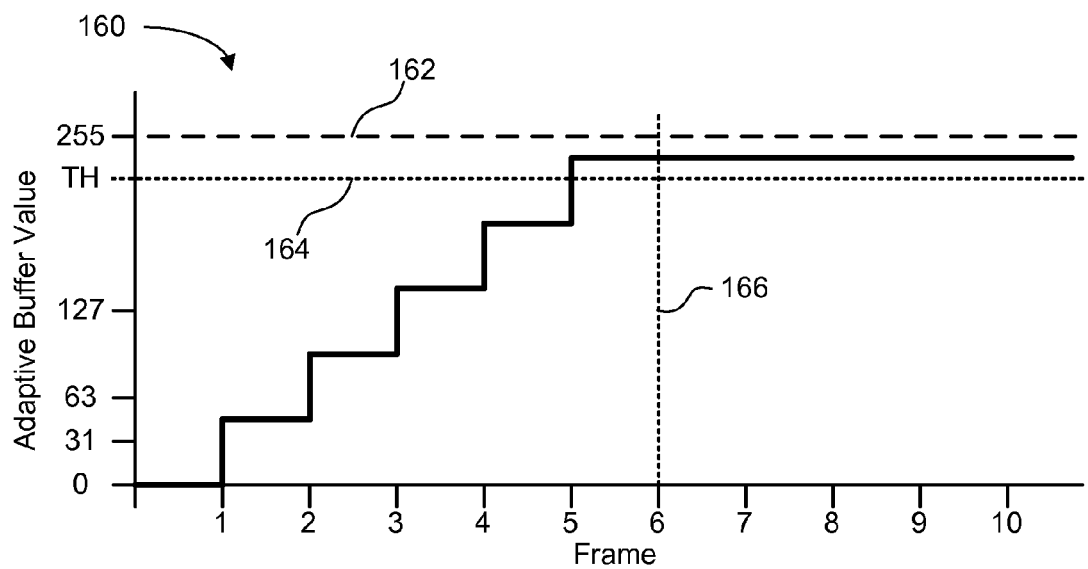
FIG. 5 depicts a schematic signal diagram of an adaptive buffer value from an embodiment of the optical imaging system using the buffer mode controller.

In one embodiment, the prediction logic 132 is configured to predict a potential buffer overflow of one of the plurality of buffer values. In one embodiment, the prediction logic 132 includes an overflow comparator 142 to compare each of the buffer values to a threshold value. If the buffer value is above the threshold value, then the prediction logic 132 identifies a potential buffer overflow. For example, if the buffer size is 8 bits (for a maximum buffer value of 255) and the threshold value is 230, then the prediction logic 132 predicts a buffer overflow condition once the buffer value exceeds 230. In this way, the buffer mode controller 118 may take some action to prevent the buffer value from overflowing the maximum value of 255 when the next frame is obtained in the image acquisition cycle. An example of adaptive buffer control is shown in FIG. 5, and described in more detail below.

In one embodiment, the prediction logic 132 also includes a mode table 144 to store a plurality of mode bits that are indicative of the mode of each of the buffer lines in the buffer 120. Each buffer line in the buffer 120 corresponds to a pixel line of the pixel array 114. In one embodiment, the mode bit for each buffer line indicates whether the buffer line operates in the accumulation mode or the averaging mode. In other words, the mode bit for a buffer line indicates whether the buffer mode controller 118 uses the accumulation logic 134 to add a subsequent pixel value to a current buffer value in the buffer 120, or uses the averaging logic 136 to generate an average value based on the subsequent pixel value and the corresponding buffer value in the buffer 120.

In one embodiment, the accumulation logic 134 implements the accumulation mode, as described above. In particular, the accumulation logic 134 adds each new pixel value to the existing buffer value already in the buffer 120. In one embodiment, the accumulation logic 134 implements the accumulation mode, according to the following:

$$y[N]=y[N-1]+x[N],$$

where N designates the frame, y[N] designates a new buffer value for the frame, y[N−1] designates the corresponding previous buffer value for the previous frame, and x[N] designates the corresponding pixel value for the frame. Other embodiments may implement variations of this accumulation formula.

The accumulation logic 134 also includes an accumulation counter 146. In one embodiment, the accumulation counter 146 tracks an accumulation count for each buffer line in the buffer 120. For example, for an image that is 2 megapixels (and, hence, each frame is 2 megapixels), the accumulation counter 146 may store 1200 accumulation counts—one for each buffer line of the image. Other embodiments may store fewer or more accumulation counts. The accumulation count for each buffer line is indicative of a total number of accumulation updates for the corresponding buffer line. In other words, each time one or more buffer values in a buffer line are updated using the accumulation mode, the accumulation counter increases the accumulation count. In one embodiment, the accumulation count is used by the averaging logic 136, as described below.

In one embodiment, the averaging logic 136 implements the averaging mode. In particular, the averaging logic 136 generates an average value based on the new pixel value for a frame and the existing buffer value already in the buffer 120.

In one embodiment, the averaging logic implements the averaging mode, according to the following:

$$y[N] = \frac{y[N-1] + X[N]}{2},$$

and $$X[N] = P \times x[N],$$

where N, y[N], y[N−1], and x[N] are the same as above, X[N] designates a normalized value of the corresponding pixel value for the frame, and P designates the accumulation count. In other words, the averaging logic 136 computes each buffer value according to an average value of the normalized value of the corresponding pixel value and the corresponding previous buffer value. It should be noted that dividing by two makes this averaging equation relatively simple to implement, for example, using just a bit shift.

In another embodiment, the averaging logic 136 implements the averaging mode to give more weight to the previous value stored in the buffer 120, according to the following:

$$y[N] = \frac{y[N-1] + X[N]}{N},$$

$$Y[N-1] = (N-1) \times y[N-1], \text{ and}$$

$$X[N] = P \times x[N],$$

where N, y[N], y[N−1], x[N], P, and X[N] are the same as above, and Y[N−1] designates a normalized value of the corresponding previous buffer value for the frame. In this implementation, the previous buffer value contributes more heavily to the new buffer value. Although this implementation may be more computationally complex, the new buffer value is less affected by drastic changes in the corresponding pixel values of each frame. For example, if there is a sudden drop in input pixel values, for example, due to an outlier of noise, then the weighting of the previous buffer value limits the potential effect of the new pixel value that is significantly different.

In one embodiment, the modification counter 138 tracks a modification count for each buffer line in the buffer 120. The modification count is similar to the accumulation count, except the modification count is indicative of a total number of buffer value updates for the corresponding buffer line. In other words, the modification counter 138 increments the modification count each time the corresponding buffer line is updated, regardless of whether the buffer line is updated using the accumulation mode or the averaging mode. In one embodiment, the accumulation counter 146 and the modification counter 138 are each 4-bit counters (e.g., where 16 or fewer frames are obtained for an image). In this embodiment, the accumulation counter 146 and the modification counter 138 may be combined into a one byte-wide buffer (not shown). Other embodiments may implement other types and sizes of counters.

Figure 4:
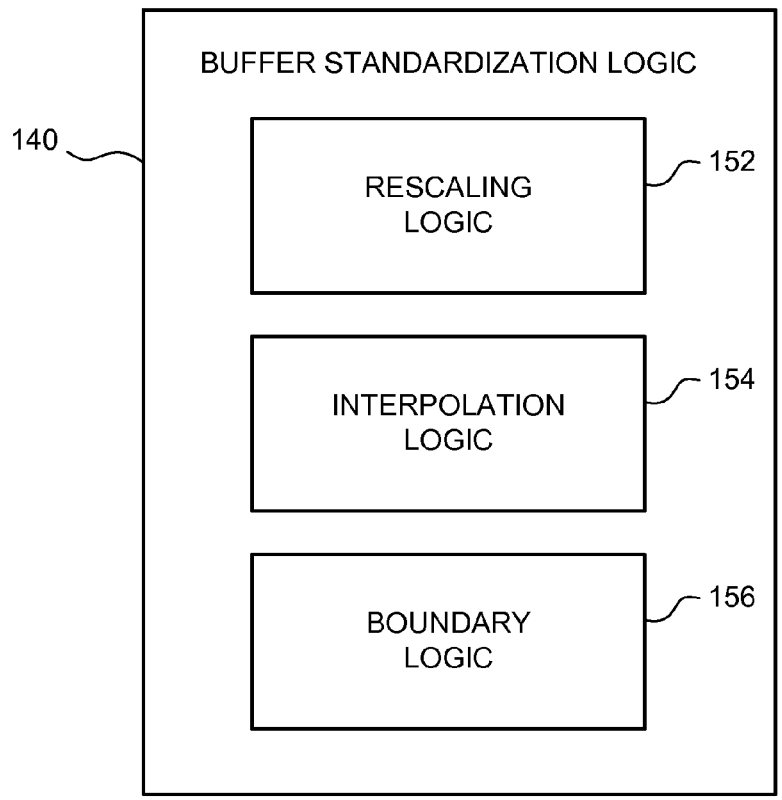
FIG. 4 depicts a schematic block diagram of one embodiment of the buffer standardization logic of the buffer mode controller shown in FIG. 3.

In one embodiment, the buffer standardization logic 140 facilitates standardization of the buffer lines in the buffer 120 and generation of a coherent final image. FIG. 4 depicts a schematic block diagram of one embodiment of the buffer standardization logic 140 of the buffer mode controller 118 shown in FIG. 3. The illustrated buffer standardization logic 140 includes rescaling logic 152, interpolation logic 154, and boundary logic 156. In general, the rescaling logic 152 is configured to adjust the brightness values of at least one of the buffer values in the buffer 120, the interpolation logic 154 is configured to interpolate a plurality of final buffer values for at least one buffer line of the buffer 120 using final buffer values of adjacent buffer lines of the buffer 120, and the boundary logic 156 is configured to shift a boundary of a buffered image to exclude at least some buffer values at an edge of the buffered image from a final image. More specific descriptions of the functionality of the buffer standardization logic 140 are described below.

Figure 1A:
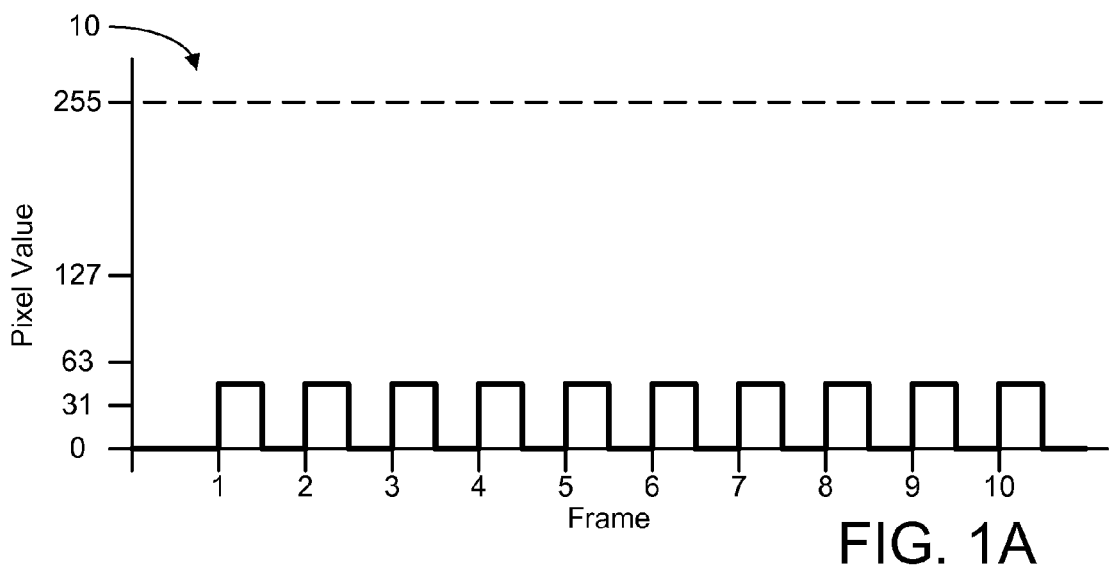
FIG. 1A depicts a schematic signal diagram of pixel values for a pixel over an image acquisition cycle of multiple frames.

FIG. 5 depicts a schematic signal diagram 160 of an adaptive buffer value from an embodiment of the optical imaging system 100 using the buffer mode controller 118. As described above, the buffer mode controller 118 implements an adaptive mode, rather than strictly an accumulation mode or an averaging mode, to store buffer values in the buffer 120 based on the pixel values from the image sensor 112. In other words, the buffer mode controller 118 adaptively determines which mode—accumulation or averaging—to use to combine the pixel values of each frame with the buffer values already stored in the buffer 120 from previous frames of the image acquisition cycle. In order to understand the differences between the accumulation, averaging, and adaptive modes, an example of each mode is described below. In order to maintain consistency among the various examples, FIG. 1A is referred to as providing a sequence of pixel values for a single pixel in a pixel line of the pixel array 114. Although the pixel values are shown as being the same for each frame, other embodiments, may use pixel values that vary over one or more frames. The following table lists the pixel values for each frame shown in FIG. 1A.

| Frame (N) | Pixel Value (x[N]) |
|---|---|
| 1 | 48 |
| 2 | 48 |
| 3 | 48 |
| 4 | 48 |
| 5 | 48 |
| 6 | 48 |
| 7 | 48 |
| 8 | 48 |
| 9 | 48 |
| 10 | 48 |

Accumulation Mode. The accumulation mode establishes a cumulative value of the pixel values. The following table shows the cumulative value after each frame.

| Frame (N) | Pixel Value (x[N]) | Cumulative Value (y[N]) |
|---|---|---|
| 1 | 48 | 48 |
| 2 | 48 | 96 |
| 3 | 48 | 144 |
| 4 | 48 | 192 |
| 5 | 48 | 240 |
| 6 | 48 | 288 |
| 7 | 48 | 336 |
| 8 | 48 | 384 |
| 9 | 48 | 432 |
| 10 | 48 | 470 |

Figure 1B:
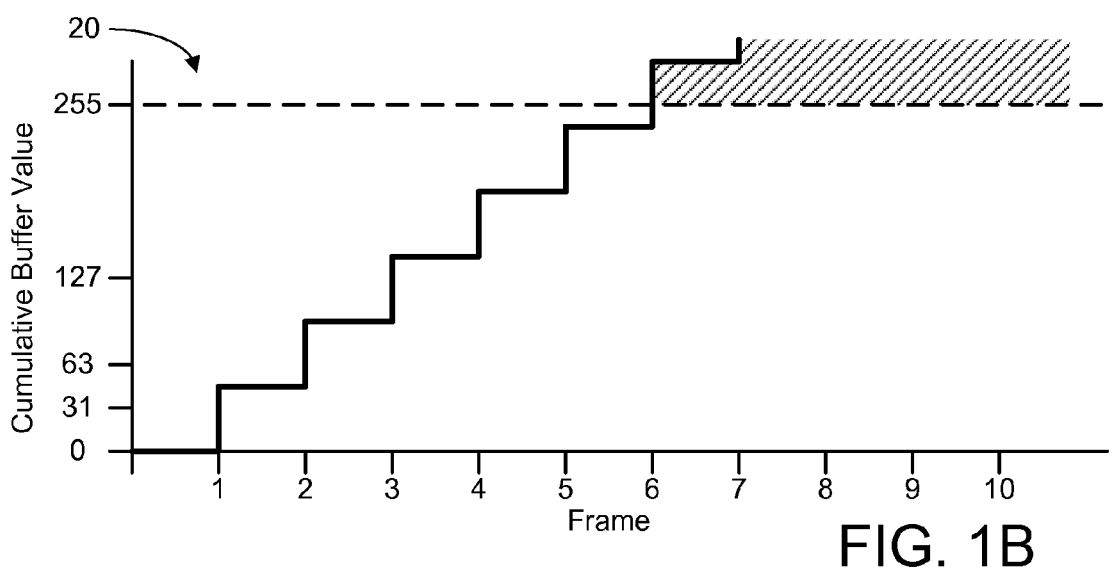
FIG. 1B depicts a schematic signal diagram of a cumulative buffer value from an exemplary conventional signal accumulation method.

It should be noted that the cumulative value starting at frame 6 overflows an 8-bit buffer because the 8-bit buffer is only able to accurately account for 256 levels of granularity (i.e., between 0 and 255). This overflow condition is conveyed by the signal diagram 20 of FIG. 1B.

Averaging Mode. The averaging mode establishes an average value of the pixel values. The following table shows the average value after each frame.

| Frame (N) | Pixel Value (x[N]) | Average Value (y[N]) |
|---|---|---|
| 1 | 48 | 48 |
| 2 | 48 | 48 |
| 3 | 48 | 48 |
| 4 | 48 | 48 |
| 5 | 48 | 48 |
| 6 | 48 | 48 |
| 7 | 48 | 48 |
| 8 | 48 | 48 |
| 9 | 48 | 48 |
| 10 | 48 | 48 |

It should be noted that the average value remains low if each of the pixel values is low. Therefore, the resulting image may be too dark. This dark condition is conveyed by the signal diagram 30 of FIG. 1C.

Adaptive Mode. In the adaptive mode, the buffer 120 stores either the cumulative value or the average value, or a combination thereof, of the pixel values. In one embodiment, the adaptive mode switches from the accumulation mode to the averaging mode once a buffer overflow is predicted. The following table shows the adaptive buffer value after each frame.

| Frame (N) | Pixel Value (x[N]) | Accumulation Count (P) | Normalized Pixel Value (X[N]) | Adaptive Buffer Value (y[N]) |
|---|---|---|---|---|
| 1 | 48 | 1 | N/A | 48 |
| 2 | 48 | 2 | N/A | 96 |
| 3 | 48 | 3 | N/A | 144 |
| 4 | 48 | 4 | N/A | 192 |
| 5 | 48 | 5 | N/A | 240 |
| 6 | 48 | 5 | 240 | 240 |
| 7 | 48 | 5 | 240 | 240 |
| 8 | 48 | 5 | 240 | 240 |
| 9 | 48 | 5 | 240 | 240 |
| 10 | 48 | 5 | 240 | 240 |

The signal diagram 160 of FIG. 5 depicts this scenario in which the adaptive buffer mode implements the accumulation mode for frames 1-5 and then implements the averaging mode for frames 6-10. In one embodiment, the buffer mode controller 118 initially uses the accumulation mode for each buffer line until the prediction logic 132 predicts a potential overflow for the buffer line, in which the value stored in the buffer 120 might exceed the capacity of the buffer 120. The capacity of the buffer 120 is indicated by the dashed horizontal line 162. For example, the capacity of an 8-bit buffer is 256 levels from 0 to 255. In order to predict a potential overflow, the overflow comparator 142 compares the buffer value to a threshold value, TH, after each frame. In FIG. 5, the threshold value, TH, is indicated by the dotted horizontal line 164. As shown in FIG. 5, the buffer value exceeds the threshold value after frame 5. Hence, starting with frame 6 indicated by the dotted vertical line 166, the buffer mode controller 118 implements the averaging mode for the remainder of the image acquisition cycle. In this way, the buffer mode controller 118 prevents a potential buffer overflow from occurring.

As explained above, the averaging mode is implemented to account for the prior accumulated buffer values. Rather than simply averaging a new pixel value (e.g., the value 48 obtained at frame 6) with the previously accumulated buffer value (e.g., the accumulated value of 240) from the previous frames 1-5, the averaging logic 136 first normalizes the new pixel value so that it is comparable to the accumulated buffer value. In one embodiment, the averaging logic 136 multiplies the new pixel value by the accumulation count (e.g., 5 counts) to determine the normalized pixel value to be averaged with the accumulated buffer value from the previous frames. Other embodiments may implement other techniques to normalize the new pixel value.

As a further example, the final buffer value obtained using the adaptive mode may depend on the type of averaging equation that is implemented. In particular, the final buffer value may change depending on whether or not the averaging equation weights the previous buffer value more heavily than the normalized pixel value. As explained above, the first averaging equation does not weight the previous buffer value, while the second averaging equation does weight the previous buffer value. The following table shows a difference between final buffer values obtained using each of these averaging equations.

| Frame (N) | Pixel Value (x[N]) | Adaptive Buffer Value (y[N]) Without Weighting | Adaptive Buffer Value (y[N]) With Weighting |
|---|---|---|---|
| 1 | 48 | 48 | 48 |
| 2 | 48 | 96 | 96 |
| 3 | 48 | 144 | 144 |
| 4 | 48 | 192 | 192 |
| 5 | 48 | 240 | 240 |
| 6 | 0 | 120 | 200 |
| 7 | 48 | 180 | 206 |

It should be noted that, with the pixel value of zero in frame six, the pixel value calculation using an averaging equation with weighting for the previous buffer value results in a more consistent new pixel value. Although a specific weighting equation is provided above, other embodiments may use other weighted averaging equations to produce similar results.

Figure 6:
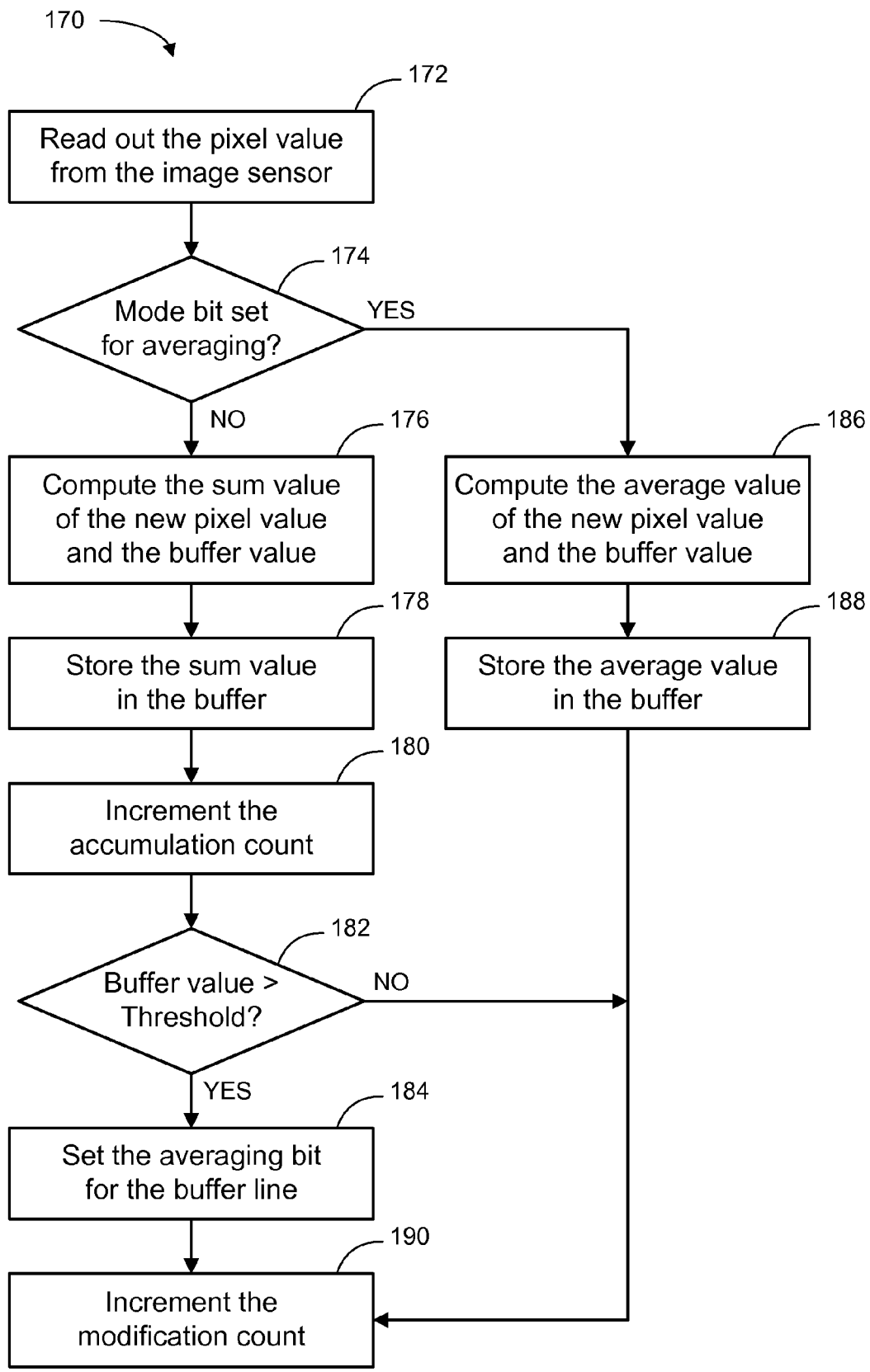
FIG. 6 depicts a schematic flow chart diagram of one embodiment of a method for storing buffer values in the buffer of the optical imaging system of FIG. 2.

FIG. 6 depicts a schematic flow chart diagram of one embodiment of a method 170 for storing buffer values in the buffer 120 of the optical imaging system 100 of FIG. 2. Although some embodiments of the method 170 are implemented in conjunction with the optical imaging system 100, other embodiments of the method 170 may be implemented in conjunction with other optical imaging systems. Also, it should be noted that some embodiments of the method 170 also include one or more operations to adjust incoming pixel values with respect to the corresponding buffer locations to account for movement of the imaged scene in different frames. For clarity, embodiments of such motion compensation are not shown in FIG. 6, but are shown in FIGS. 10A-C and 11 and described in more detail below.

In the method 170 for storing buffer values in the buffer 120, at block 172 the buffer mode controller 118 reads out a pixel value from the image sensor 112. In one embodiment, pixel values are read out in groups corresponding to pixel rows, pixel columns, or other pixel groupings within the pixel array 114. Although the depicted method 170 only describes processing a single pixel value, multiple pixel values from a pixel line may be processed approximately simultaneously using parallel hardware and/or software.

In one embodiment, the buffer mode controller 118 initially sets all buffer lines in the buffer 120 to accumulate pixel values in the accumulation mode. However, other embodiments make a mode determination even for the initial pixel line readout. After reading out a pixel value in one of the frames of an image acquisition cycle, at block 174 the buffer mode controller 118 determines if the mode bit for the corresponding buffer line is set for the averaging mode. In one embodiment, the mode table 144 stores a mode bit for each buffer line. The mode bit indicates whether the corresponding buffer line is set for the accumulation mode or the averaging mode. Other embodiments (see FIGS. 7 and 8) omit the mode table 144 and use other operations to determine whether to implement the accumulation mode or the averaging mode.

If the mode bit is set for the accumulation mode, then at block 176 the accumulation logic 134 computes a sum value of the new pixel value and the current buffer value. At block 178, the accumulation logic 134 stores the sum value in the corresponding buffer location. At block 180, the accumulation counter 146 increments the accumulation count. At block 182, the prediction logic 132 then determines if the buffer value stored in the buffer 120 exceeds a threshold value. As explained above, the overflow comparator 142 may compare the buffer value to the threshold value. The threshold may be predetermined as a bit value (e.g., 230 for an 8-bit value), as a number of bits (e.g., 7 bits for an 8-bit value), as a percentage (e.g., 90% for an 8-bit value), or as some other amount. Additionally, some embodiments dynamically adjust the value of the threshold during the course of an image acquisition cycle. If the buffer value exceeds the threshold value, then at block 184 the prediction logic 132 sets the mode bit in the mode table 144 for the averaging mode for the corresponding buffer line in the buffer 120.

Referring back to the determination at block 174, if the mode bit is set for the averaging mode, then at block 186 the averaging logic 136 computes an average value of the new pixel value and the current buffer value. In one embodiment, the averaging logic 136 first calculates a normalized pixel value to average with the current buffer value. The averaging logic 136 then stores the average value in the corresponding buffer location. After storing the average value in the buffer 120, or after the prediction logic 132 determines at block 182 that the buffer value does not exceed the threshold value, or after the prediction logic 132 sets the mode bit at block 184 to implement the averaging mode in a subsequent frame, then at block 190 the modification counter 138 increments the modification count. The depicted method 170 then ends.

It should be noted that, in some embodiments, the switch from the accumulation mode to the averaging mode occurs at most once during an image acquisition cycle. This is because once the buffer value exceeds the threshold value, averaging the subsequent, normalized pixel values with the stored buffer values in each frame is unlikely to significantly increase or decrease the value stored in the buffer 120. However, other embodiments may allow the buffer mode controller 118 to switch multiple times between the accumulation mode and the averaging mode.

It should also be noted that, although some embodiments of the buffer mode controller 118 apply the accumulation mode and the averaging mode to each row individually, other embodiments may use a different granularity when determining which buffer locations to operate in the accumulation mode or the averaging mode. For example, some embodiments may adaptively switch between buffer modes on a per-pixel basis. Other embodiments may implement the adaptive buffer modes on groups of multiple buffer lines. Other embodiments may implement the adaptive buffer modes on each frame as a whole.

Figure 7:
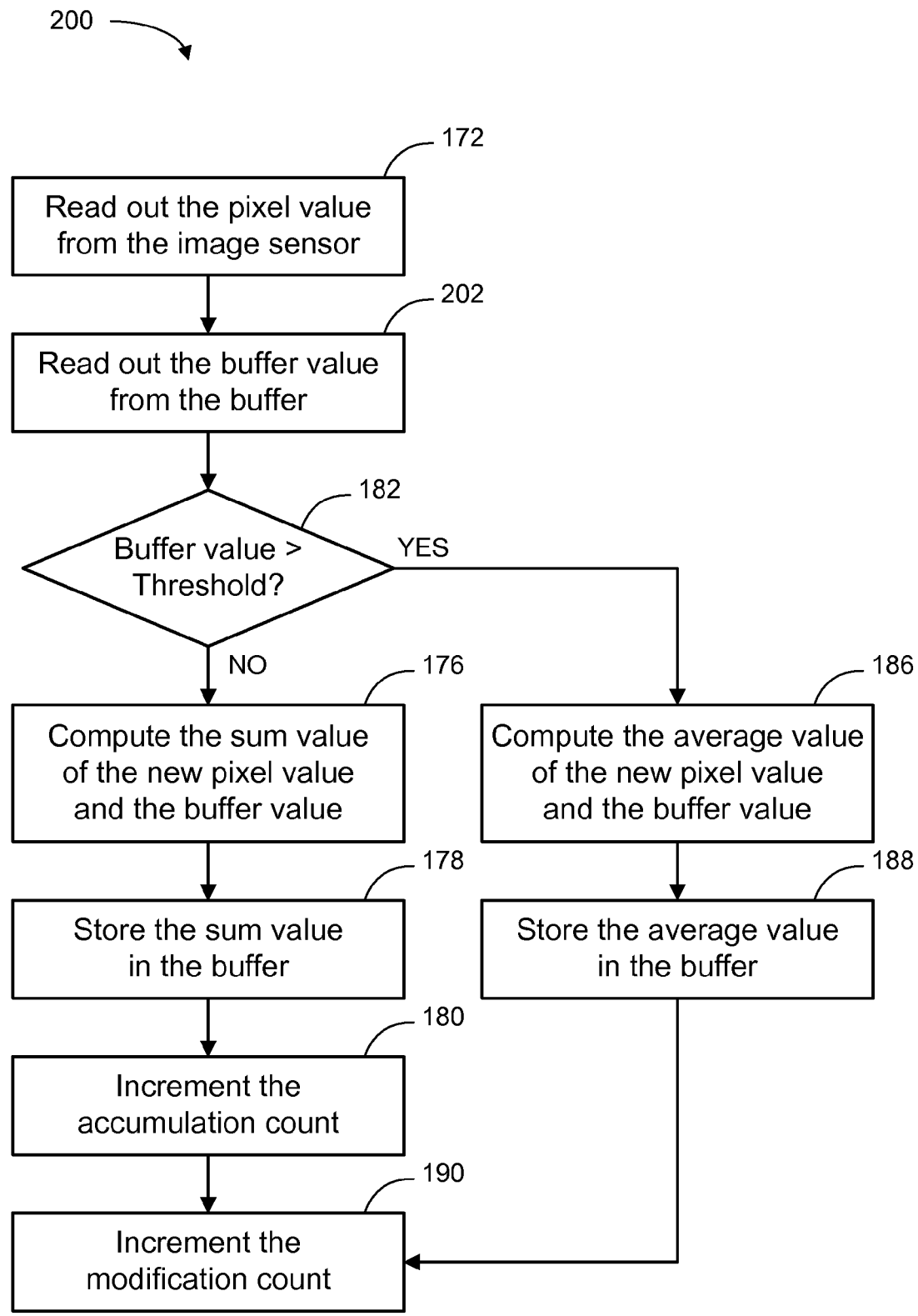
FIG. 7 depicts a schematic flow chart diagram of another embodiment of a method for storing buffer values in the buffer of the optical imaging system of FIG. 2.

FIG. 7 depicts a schematic flow chart diagram of another embodiment of a method 200 for storing buffer values in the buffer 120 of the optical imaging system 100 of FIG. 2. Although some embodiments of the method 200 are implemented in conjunction with the optical imaging system 100, other embodiments of the method 200 may be implemented in conjunction with other optical imaging systems. Additionally, some of the operations of the method 200 are similar to operations of the method 170 of FIG. 6 and, hence, are not described in more detail in the description of FIG. 7.

At block 172, the buffer mode controller 118 reads out a pixel value from the image sensor 112. Then, at block 202 the buffer mode controller 118 reads out a corresponding buffer value from the buffer 120. In one embodiment, the buffer mode controller 118 implements one or more motion compensation operations to determine the corresponding buffer location. At block 182, the prediction logic 132 then compares the buffer value to the threshold value to determine whether to implement the accumulation mode (see blocks 176-180) or the averaging mode (see blocks 186-188). After implementing either the accumulation mode or the buffer mode, at block 190 the modification counter 138 increments the modification count.

It should be noted that the method 200 of FIG. 7 is similar in many aspects to the method 170 of FIG. 6. However, the method 200 of FIG. 7 makes a determination whether to implement the accumulation mode or the averaging mode based on the actual value stored in the corresponding buffer location. In contrast, the method of FIG. 6 makes the determination based on a corresponding mode bit value in the mode table 144. While both of these methods 170 and 200 make the same determination based on previous buffer values already stored in the buffer 120, the method 200 of FIG. 7 uses the corresponding buffer value directly, but the method 170 of FIG. 6 uses the mode bit which depends on the stored buffer value, as well as all of the other stored buffer values in the same buffer line. Hence, the method 200 of FIG. 7 implements a per-pixel determination, while the method 170 of FIG. 6 implements a per-line determination.

Figure 8:
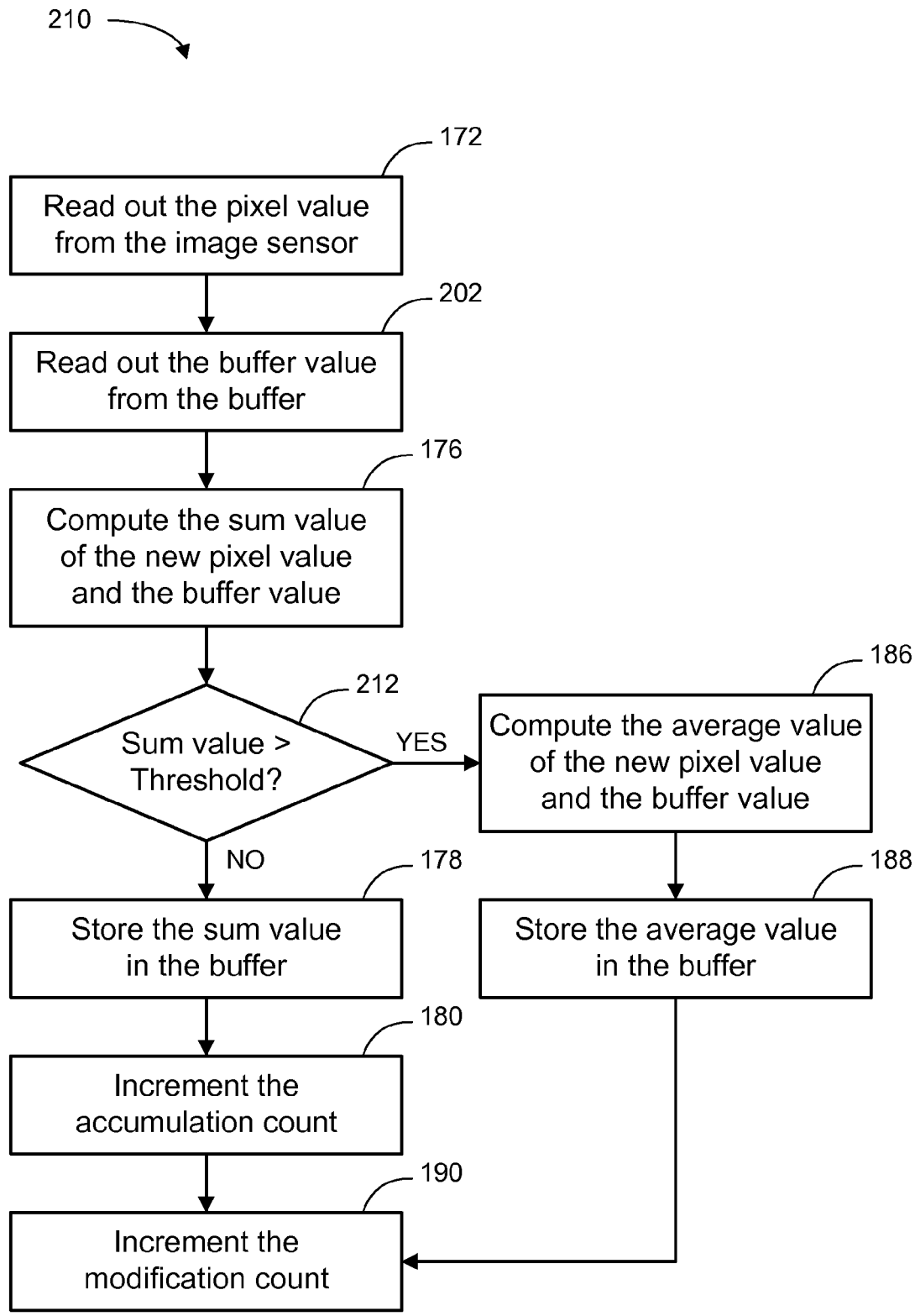
FIG. 8 depicts a schematic flow chart diagram of another embodiment of a method for storing buffer values in the buffer of the optical imaging system of FIG. 2.

FIG. 8 depicts a schematic flow chart diagram of another embodiment of a method 210 for storing buffer values in the buffer 120 of the optical imaging system 100 of FIG. 2. Although some embodiments of the method 210 are implemented in conjunction with the optical imaging system 100, other embodiments of the method 210 may be implemented in conjunction with other optical imaging systems. Additionally, some of the operations of the method 210 are similar to operations of the method 170 of FIG. 6 and the method 200 of FIG. 7 and, hence, are not described in more detail in the description of FIG. 8.

At block 172, the buffer mode controller 118 reads out a pixel value from the image sensor 112. Then, at block 202 the buffer mode controller 118 reads out a corresponding buffer value from the buffer 120. In one embodiment, the buffer mode controller 118 implements one or more motion compensation operations to determine the corresponding buffer location. At block 176, the accumulation logic 134 preliminarily computes a sum value of the new pixel value and the current buffer value. This sum value is not immediately stored in the buffer 120. Instead, at block 212 the prediction logic 132 compares the sum value to the threshold value to determine whether to implement the remaining operations of the accumulation mode (see blocks 178-180) or the operations of the averaging mode (see blocks 186-188). After implementing either the accumulation mode or the buffer mode, at block 190 the modification counter 138 increments the modification count.

It should be noted that the method 210 of FIG. 8 is similar in many aspects to the method 200 of FIG. 7. However, the method 210 of FIG. 8 makes a determination whether to implement the accumulation mode or the averaging mode based on the actual sum value that would be stored if the buffer mode controller 118 implements the accumulation mode. Since the prediction logic 132 uses the actual sum value in the comparison at bock 212, the prediction logic 132 alternatively may compare the actual sum value to the maximum value (e.g., 255 for an 8-bit buffer) allowed by the buffer 120, instead of comparing the actual sum value to a lower threshold value (e.g., 230 for an 8-bit buffer). In this way, the prediction logic 132 makes an accurate prediction each time. It should also be noted that, since the method 200 of FIG. 7 and the method 210 of FIG. 8 implement a per-pixel determination, other operations implemented by the buffer mode controller 118 also may be implemented on a per-pixel basis, instead of a per-line basis. However, implementing at least some operations on a per-line basis may be simpler and less costly than implementing the same operations on a per-pixel basis.

Figure 9:
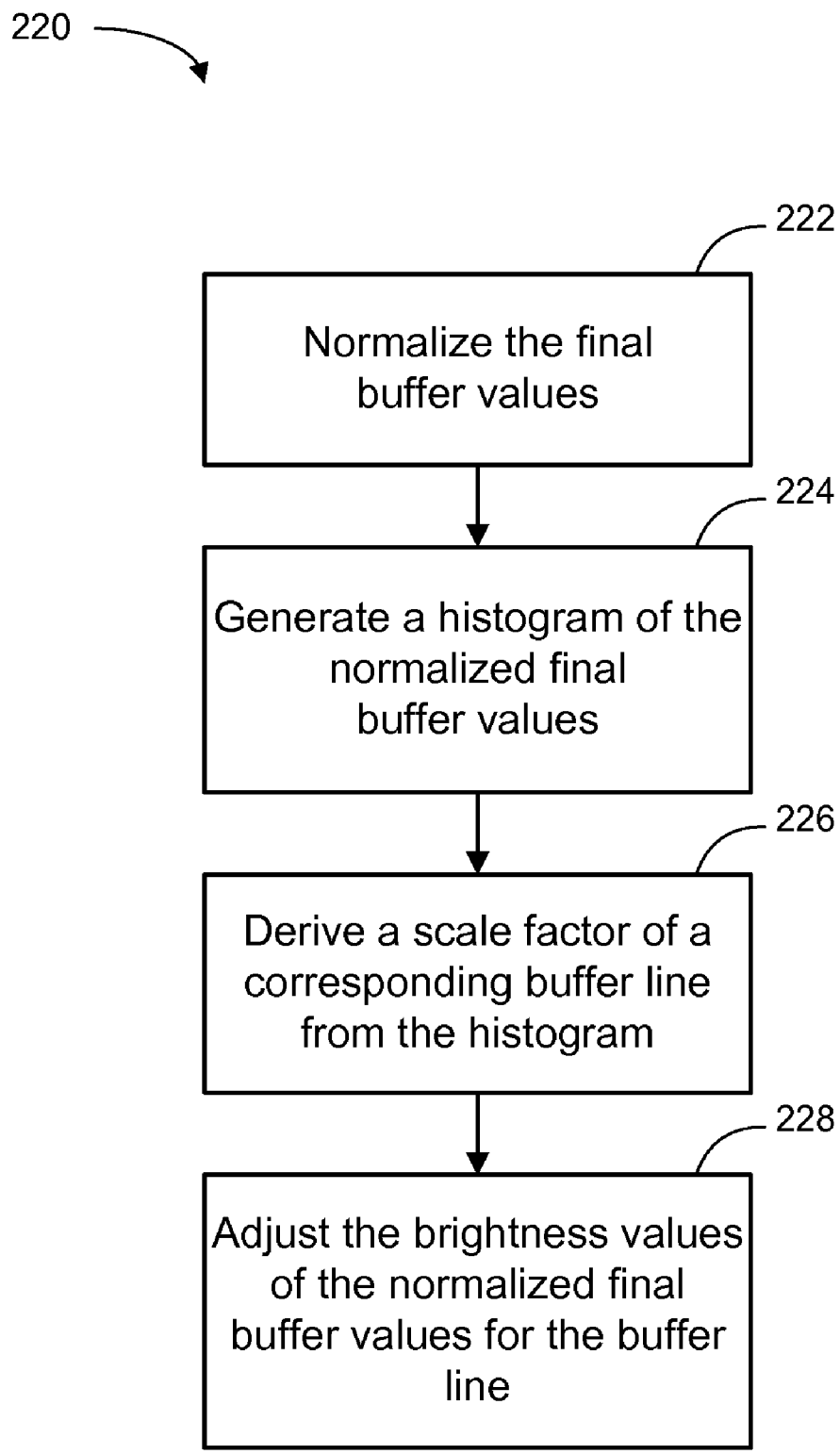
FIG. 9 depicts a schematic flow chart diagram of one embodiment of a method for standardizing the buffer values stored in the buffer of the optical imaging system of FIG. 2.

FIG. 9 depicts a schematic flow chart diagram of one embodiment of a method 220 for standardizing the buffer values stored in the buffer 120 of the optical imaging system 100 of FIG. 2. Although some embodiments of the method 220 are implemented in conjunction with the optical imaging system 100, other embodiments of the method 220 may be implemented in conjunction with other optical imaging systems.

In the method 220 for standardizing the buffer values, at block 222 the final buffer values in the buffer 120 are normalized. Then, at block 224 a histogram of the normalized final buffer values is generated. After the histogram is generated, at block 226 a scale factor for a buffer line is derived from the histogram. Then, at block 228 the brightness values of the normalized final buffer values for the buffer line are adjusted. In this way, the method 220 rescales the output buffer lines, row by row or column by column, to equalize the brightness of all of the lines that switched from the accumulation mode to the averaging mode at different times during the image acquisition cycle.

As a more specific example of the method 220, the resealing may be performed by computing the histogram of output values, each scaled by the accumulation count for the corresponding buffer line. Then, the 98-th percentile of the histogram is scaled to 255, and each row is stretched by the same amount, but normalized by the corresponding accumulation count.

As a further explanation, the histogram is formed of buffer values of the image, B. Each buffer value is divided by the corresponding accumulation count P[k] (where k designates the corresponding buffer line). For example, if a buffer has red value of 64, and the accumulation count for the buffer line is 4, then the histogram bin 16 (i.e., 64/4=16) is incremented. For an 8-bit buffer, the histogram bins are from 0 to 255. The cumulative sum of the histogram is then computed. For example, if the histogram is designated as H[i], then the cumulative sum may be calculated according to the following:

$$C[b] = \text{sum from } i=0 \text{ to } b, H[i], \text{ for } b=0 \text{ to } 255$$

Subsequently, the 98-th percentile of H is computed, according to the following:

$$b98 = \text{minimum value of } b \text{ such that } C[b] >= 0.98*H[255]$$

Next, the 98-th percentile is boosted to 255, for example, to make the image more pleasing by increasing the brightness so that the top 2% saturates. In one embodiment, the scale factor is:

$$s98 = 255/b98$$

For example, if b98=32, so that 98% of the values of B are in the range 0 to 32, then s98=7.96875. However, in order to prevent an overboost, the scale factor may be kept to a maximum of the modification count, N (which also may be the number of images used in the sum), according to the following:

$$s98 = \text{minimum}(N, s98)$$

For example, if the modification count is 4, and the scale factor is about 7.9, then the scale factor may be reset to 4.

Next, for each row, k, in the final image, B, the brightness may be adjusted by a factor of:

$$\text{factor}[k] = s98/P[k], \text{ for } k=0 \ldots \text{ max rows, and}$$

$$B[k,:] = B[k,:]*s98/P[k], \text{ (where ":" means for all the pixels on that line)}$$

Note that if P[k]=0, then that row is not modified.

Essentially, the scale factor is the medium scale value. Lines of the final image, B, with an accumulation count, P[k], smaller than the scale factor, s98, are brightened. In contrast, lines with an accumulation factor, P[k], larger than the scale factor, s98, are darkened. Other embodiments may use other resealing operations.

Figure 1C:
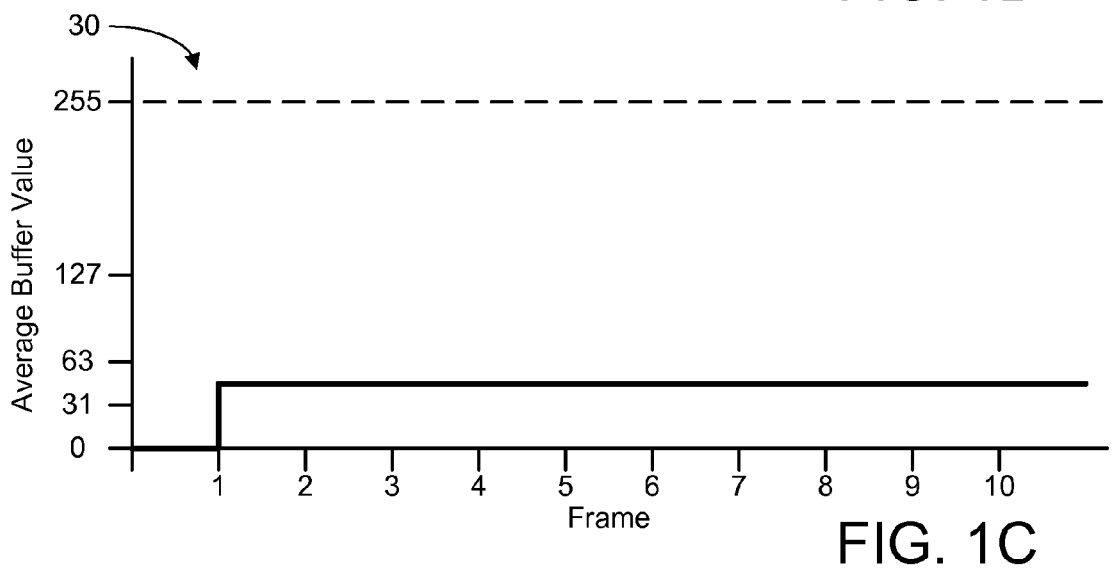
FIG. 1C depicts a schematic signal diagram of an average buffer value from an exemplary conventional signal averaging method.
Figure 10A:
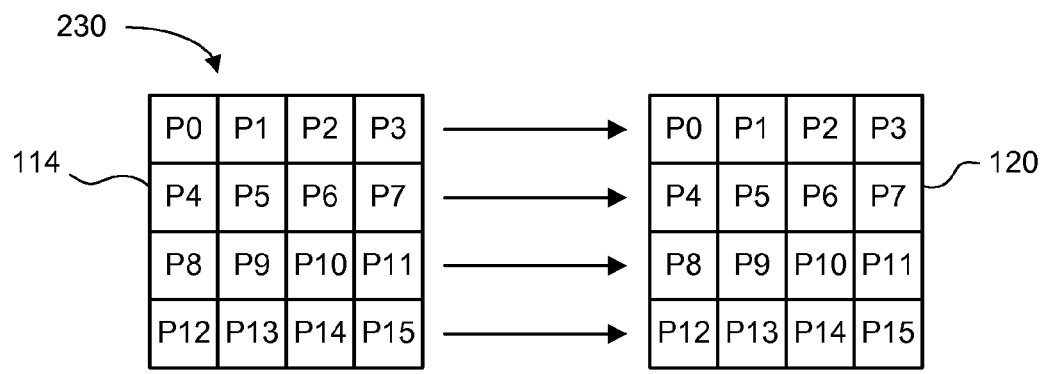
FIGS. 10A-C depict schematic diagrams of various value correlations between pixel values of a pixel array and buffer values of a buffer. In particular.
Figure 10B:
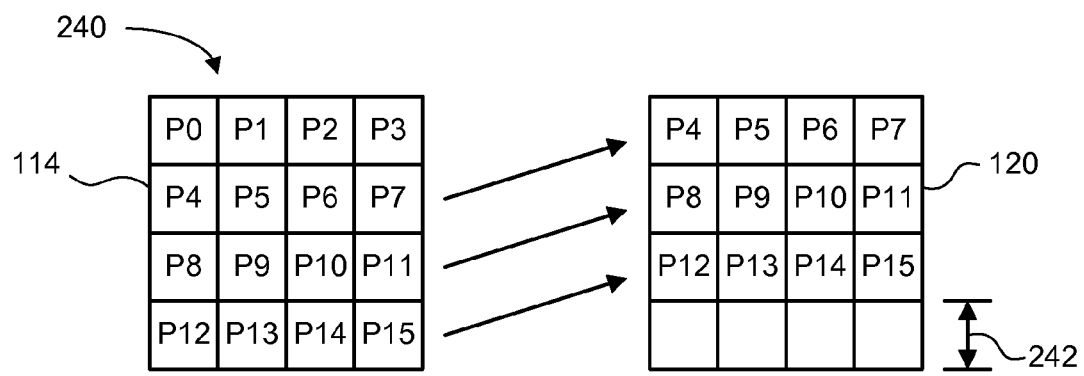
Figure 10C:
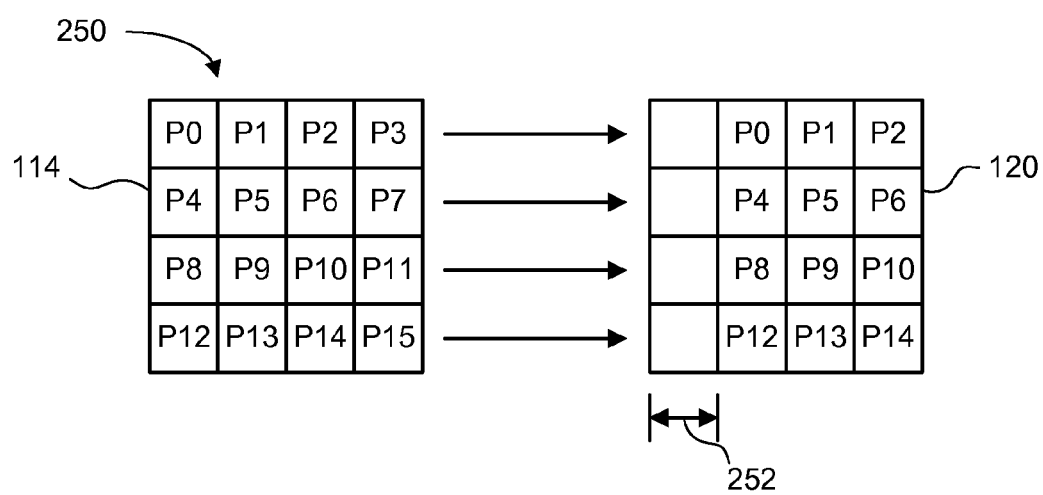

FIGS. 10A-C depict schematic diagrams of various value correlations between pixel values of a pixel array 114 and buffer values of a buffer 120. In particular, FIG. 10A depicts a direct correlation 230 between the pixel values and the buffer values. In this configuration, the pixel values are stored in corresponding buffer locations without any vertical or horizontal shifting of the pixel values. FIG. 10B depicts a vertically shifted correlation 240 between the pixel values and the buffer values. In particular, the pixel values are shifted by a vertical offset 242 (e.g., one pixel row) based on some motion detection that indicates the new pixel values correlate to the previous buffer values stored in the indicated buffer locations. FIG. 1C depicts a horizontally shifted correlation 250 between the pixel values and the buffer values. In particular, the pixel values are shifted by a horizontal offset 252 (e.g., on pixel column) base on some motion detection that indicates the new pixel values correlate to the previous buffer values stored in the indicated buffer locations.

Figure 11:
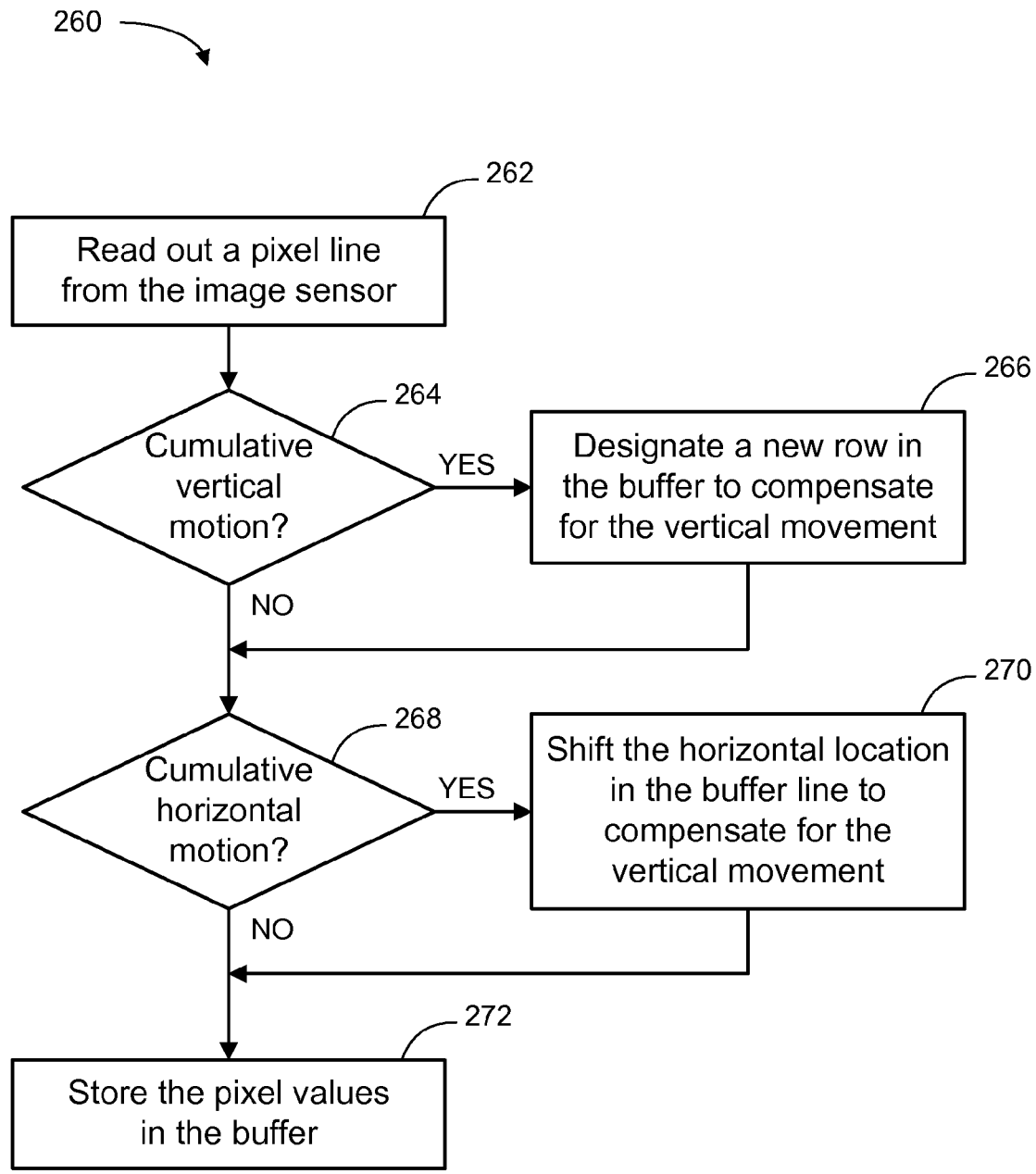
FIG. 11 depicts a schematic flow chart diagram of one embodiment of a method for compensating for relative movement of images acquired over time for an image acquisition cycle of the optical imaging system of FIG. 2.

FIG. 11 depicts a schematic flow chart diagram of an embodiment of a method 260 for compensating for relative movement of images acquired over time for an image acquisition cycle of the optical imaging system 100 of FIG. 2. Although some embodiments of the method 260 are implemented in conjunction with the optical imaging system 100, other embodiments of the method 260 may be implemented in conjunction with other optical imaging systems.

In the motion compensation method 260, at block 262 a pixel line is read out from the image sensor. At block 264, a determination is made whether or not there is cumulative vertical motion of the image sensor 112 over the image acquisition cycle. If there is cumulative vertical motion above a threshold, then at block 266 a new row in the buffer 120 is designated to compensate for the vertical movement. Then, at block 268 a determination is made whether or not there is cumulative horizontal motion of the image sensor 112 over the image acquisition cycle. If there is cumulative horizontal motion above a threshold, then at block 270 the horizontal location in the indicated buffer line is shifted to compensate for the horizontal movement. Subsequently, at block 272 the pixel values are stored in the corresponding buffer locations of the buffer 120. The depicted motion compensation method 260 then ends.

In some embodiments, the motion compensation method 260 may be initiated in response to a motion detected by the motion detector 108. As a matter of nomenclature, this motion compensation method 260 may be referred to as real time shifted accumulation (RTSA), although the motion shifting may be implemented in both the accumulation and averaging modes. In some embodiments, the ability to dynamically switch between the accumulation mode and the averaging mode (i.e., using the adaptive buffer mode) facilitates the implementation of real time shifted accumulation. In particular, the accumulation logic may implement motion shifting in at least one direction prior to accumulation. Similarly, the averaging logic may implement motion shifting in at least one direction prior to averaging. Other embodiments may implement motion shifting. Furthermore, by recording the minimum and maximum horizontal shifts used, the left and right boundaries of the image can optionally be cropped or framed to hide variable intensity ramps which would otherwise occur at the edges. In one embodiment, the boundary logic 156 of the buffer standardization logic 140 implements such cropping or framing.

Additionally, the sharpness of the final shifted image can be improved by using pixel values from subsequent frames that are similar within some threshold before being accumulated. In other words, blurry images may be avoided, at least to some degree, by skipping accumulation of pixel values when the values change significantly over subsequent frames. For example, if a pixel value for a frame is significantly lower (i.e., below some threshold) than corresponding pixel values from other frames, then the low pixel value may be omitted from the accumulation and/or averaging process. One application of this selective pixel accumulation is to prevent or reduce blurriness of the final image when the motion detection is not accurate. This idea can be extended by using gradients that are within some threshold for a particular pixel line, so that edges are not smeared into uniform regions. For example, a simple horizontal gradient may be obtained by the difference of neighboring pixels on the same row. In this way, the gradient may be used to determine if the accumulation and/or averaging processes should be implemented for one or more pixel values of a specific frame.

Embodiments of the buffer mode controller 118 described avoids overflow of the buffer 120 by adaptively switching from an accumulation mode to an averaging mode when an overflow is predicted. In one embodiment, the switch is done on a row-wise basis, which allows flexibility in accumulating a high dynamic range image. Furthermore, the buffer 120 may have a bit depth which is the same as each of the input frames. This allows the size of the buffer 120 to be smaller than if the buffer were increased in size to accommodate the overflow. Additionally, by reducing instances of clipping, image quality is improved.

Embodiments of the invention also may involve a number of functions to be performed by a computer processor such as a central processing unit (CPU), a microprocessor, or another type of general-purpose or application-specific processor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Markup Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of processors that utilize embodiments of invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the processor as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively. In particular, a computer readable storage medium embodying a program of machine-readable instructions, executable by a digital processor, may perform one or more operations of an embodiment of the invention.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical imaging system comprising:
    an image sensor with a pixel array to read out a plurality of pixel lines for a frame of an image, the image derived from a plurality of frames;
    a buffer coupled to the image sensor to store a plurality of buffer values corresponding to a plurality of pixel values for each of the pixel lines; and
    a buffer mode controller coupled to the image sensor and the buffer, the buffer mode controller to dynamically switch between an accumulation mode and an averaging mode, the accumulation mode to compute each buffer value according to a sum value of the corresponding pixel value and a corresponding previous buffer value, the averaging mode to compute each buffer value according to an average value of a normalized value of the corresponding pixel value and the corresponding previous buffer value.

2. The optical imaging system of claim 1, the buffer mode controller further comprising prediction logic to predict a potential buffer overflow of one of the plurality of buffer values.

3. The optical imaging system of claim 2, the prediction logic comprising an overflow comparator to compare each of the buffer values to a threshold value.

4. The optical imaging system of claim 2, the prediction logic comprising a mode table to store a plurality of mode bits, each mode bit corresponding to a buffer line in the buffer, each mode bit to designate the accumulation mode or the averaging mode for the corresponding buffer line.

5. The optical imaging system of claim 1, the buffer mode controller further comprising:
   accumulation logic to implement the accumulation mode, according to the following:

$y[N]=y[N-1]+x[N]$, where N designates the frame, y[N] designates a new buffer value for the frame, y[N−1] designates the corresponding previous buffer value for the previous frame, and x[N] designates the corresponding pixel value for the frame; and
   averaging logic to implement the averaging mode, according to the following:

$$y[N] = \frac{y[N-1] + X[N]}{2},$$

and $X[N]=P \times x[N]$, where X[N] designates the normalized value of the corresponding pixel value for the frame, and P designates the accumulation count.

6. The optical imaging system of claim 5, the accumulation logic further configured to implement motion shifting in at least one direction prior to accumulation, the motion shifting based on a detected motion of the image sensor.

7. The optical imaging system of claim 5, the averaging logic further configured to implement motion shifting in at least one direction prior to averaging, the motion shifting based on a detected motion of the image sensor.

8. The optical imaging system of claim 5, the accumulation logic further comprising an accumulation counter to track an accumulation count for each buffer line in the buffer, each accumulation count indicative of a total number of accumulation updates for the corresponding buffer line.

9. The optical imaging system of claim 8, the buffer mode controller further comprising a modification counter to track a modification count for each buffer line in the buffer, each modification count indicative of a total number of buffer value updates for the corresponding buffer line.

10. The optical imaging system of claim 1, the buffer mode controller further comprising:
    rescaling logic to adjust a brightness value of at least one of the buffer values in the buffer;
    interpolation logic to interpolate a plurality of final buffer values for at least one buffer line of the buffer, the final buffer values interpolated based on final buffer values of adjacent buffer lines of the buffer; and
    boundary logic to shift a boundary of a buffered image to exclude at least some buffer values at an edge of the buffered image from a final image.

11. A buffer management method for an optical imaging system, the buffer management method comprising:
    reading out a plurality of pixel lines from an image sensor for a frame of a plurality of frames in an image acquisition cycle, each pixel line comprising a plurality of pixel values;
    storing, using a digital processor, a plurality of cumulative buffer values in a first buffer line of a buffer, the first buffer line corresponding to a first pixel line for the frame, each cumulative buffer value comprising a sum value of one of the pixel values of the first pixel line and a corresponding previous buffer value of a previous frame; and
    storing, using the digital processor, a plurality of average buffer values in a second buffer line of the buffer, the second buffer line corresponding to a second pixel line for the frame, each average buffer value comprising an average value of a normalized value of one of the pixel values of the second pixel line and a corresponding previous buffer value of a previous frame.

12. The buffer management method of claim 11, further comprising:
    identifying a potential buffer overflow for one of the cumulative buffer values of the first pixel line;
    initiating a threshold condition in response to at least one of the stored cumulative buffer values above a threshold value; and
    transitioning the first pixel line from an accumulation mode to an averaging mode, in response to the potential buffer overflow, the averaging mode to store average buffer values in a subsequent frame, the average buffer values based on corresponding averages of the stored cumulative buffer values and new normalized pixel values for the corresponding pixel line in the subsequent frame.

13. The buffer management method of claim 11, further comprising:
    tracking a modification count for each buffer line in the buffer, the modification count indicative of a total number of buffer value updates for the corresponding buffer line; and
    tracking an accumulation count for each buffer line in the buffer, the accumulation count indicative of a total number of accumulation updates for the corresponding buffer line.

14. The buffer management method of claim 13, further comprising computing each average buffer value, according to the following:

$$y[N] = \frac{y[N-1] + X[N]}{2},$$

and $X[N]=P \times x[N]$, where N designates the frame, y[N] designates a new buffer value for the frame, y[N−1] designates the corresponding previous buffer value for the previous frame, X[N] designates the normalized value of the corresponding pixel value for the frame, P designates the accumulation count, and x[N] designates the corresponding pixel value for the frame.

15. The buffer management method of claim 13, further comprising computing each average buffer value, according to the following:

$$y[N] = \frac{y[N-1] + X[N]}{2},$$

$$Y[N-1] = (N-1) \times y[N-1],$$

and $$X[N] = P \times x[N],$$

where N designates the frame, y[N] designates a new buffer value for the frame, Y[N−1] designates a normalized value of the corresponding previous buffer value for the previous frame, X[N] designates the normalized value of the corresponding pixel value for the frame, y[N−1] designates the corresponding previous buffer value for the previous frame, P designates the accumulation count, and x[N] designates the corresponding pixel value for the frame.

16. The buffer management method of claim 11, further comprising rescaling at least one of the buffer lines in the buffer, the rescaling comprising:
normalizing a plurality of final buffer values of an image generated using the plurality of frames;
generating a histogram of the normalized final buffer values;
deriving a scale factor of a corresponding buffer line from the histogram of normalized final buffer values; and
adjusting brightness values of the normalized final buffer values for the corresponding buffer line.

17. The buffer management method of claim 11, further comprising:
interpolating a plurality of final buffer values for at least one other buffer line using final buffer values of adjacent buffer lines in the buffer; and
shifting at least one boundary of a buffered image represented by all of the final buffer values in the buffer to exclude a variable intensity ramp at an edge of the buffered image from a final image derived from the buffered image.

18. The buffer management method of claim 11, further comprising:
reading out a subsequent frame of the plurality of frames in the image acquisition cycle; and
omitting a pixel value of a pixel line from accumulation and averaging according to a pixel value comparison or a gradient comparison;
wherein the pixel value comparison comprises calculating a difference between the pixel value and a corresponding previous buffer value from a previous frame, comparing the difference to a pixel value threshold, and omitting the pixel value from accumulation and averaging in response to a determination that the difference exceeds the pixel value threshold;
wherein the gradient comparison comprises calculating a gradient for the pixel line of the subsequent frame, comparing the gradient to a gradient threshold, and omitting the pixel value from accumulation and averaging in response to a determination that the gradient exceeds the gradient threshold.

19. A computer readable storage medium embodying a program of machine-readable instructions, executable by a digital processor, to perform operations to buffer multiple frames of an image acquisition cycle, the operations comprising:
store a plurality of cumulative buffer values for a pixel line in a first buffer line of a buffer according to an accumulation computation in which each cumulative buffer value represents a sum value of a pixel value of a frame of the pixel line and a previous buffer value;
identify a threshold condition in which at least one of the buffer values of the first buffer line exceeds a threshold value; and
implement an averaging mode, in response to the threshold condition, to store a plurality of average buffer values for the pixel line in the buffer according to an averaging computation in which each average buffer value represents an average value of a normalized value of a pixel value of a subsequent frame of the pixel line and the cumulative buffer value.

20. The computer readable medium of claim 19, the operations further comprising:
identifying a second threshold condition in which at least one buffer value of a second buffer line exceeds the threshold value; and
transitioning the second buffer line from an accumulation mode to the averaging mode independently of the first buffer line.

* * * * *